(12) United States Patent
Clarkson et al.

(10) Patent No.: US 6,493,640 B1
(45) Date of Patent: Dec. 10, 2002

(54) CONTROL OF NUCLEIC ACID AMPLIFICATION PROCEDURES INCLUDING THE POLYMERASE CHAIN REACTION (PCR)

(75) Inventors: John Michael Clarkson, Brandford-upon-Avon (GB); Benjamin David Cobb, Brandford-upon-Avon (GB)

(73) Assignee: Molecular Sensors Limited (GB)

( * ) Notice: Subject to any disclaimer, the term of this patent is extended or adjusted under 35 U.S.C. 154(b) by 0 days.

(21) Appl. No.: 09/509,718

(22) PCT Filed: Nov. 5, 1998

(86) PCT No.: PCT/GB98/02989

§ 371 (c)(1),
(2), (4) Date: Mar. 31, 2000

(87) PCT Pub. No.: WO99/18516

PCT Pub. Date: Apr. 15, 1999

(30) Foreign Application Priority Data

Oct. 3, 1997 (GB) ............................................. 9720926

(51) Int. Cl.[7] ........................... C12Q 1/68; C12P 19/34; G06F 17/100; G06F 15/00
(52) U.S. Cl. ........................... 702/27; 435/6; 435/91.1; 435/91.2; 706/45; 706/47; 712/200
(58) Field of Search ........................ 435/6, 91.1, 91.2; 702/27; 706/45, 47; 712/200

(56) References Cited

U.S. PATENT DOCUMENTS 5,926,773 A * 7/1999 Wagner

FOREIGN PATENT DOCUMENTS

WO        WO 95/01606        1/1995        ........... G06F/15/42

OTHER PUBLICATIONS

Hsu et al., "Polymerase Chain Reaction Engineering," Biotechnology and Bioengineering, 1997, vol. 55, No. 2, pp. 359–365.*

Doc. No. XP–002090528, "A Hybrid Genetic Algorithm And Fuzzy Logic For Metabolic Modeling", Yen et al., Discovery, pp. 743–749.

Doc. No. XP 00167350, Employing Primers Selected by AI Expert System and an ART Neural Network, Benachenhou, et al., Third Annual IEEE Symposium on Computer–Based Medical Systems, Jun. 3–6, 1990, pp. 504–511.

Doc. No. XP 000643308, "Application of Genetic Algoritms to Parameter Estimation of Bioprocesses," Park Et al., Medical & Biological Engineering & Computing, Jan. 1997, pp. 47–79.

No. XP 000372808, "Genetic Algorithms in Chemistry", Hibbert, Chemometrics and Intelligent Laboratory Systems, Jul. 1993, vol. 3, pp. 277–293.

Doc. No. Xp–002090529, "Detection of RNA Polymerase II Promoters And Polyadenylation Sits in Human DNA Sequence", Matis, et al., Computers Chem, vol. 20, No. 1, pp. 135–140, 1996.

* cited by examiner

*Primary Examiner*—John S. Brusca
*Assistant Examiner*—Young KIm
(74) *Attorney, Agent, or Firm*—Stewart L. Gitler; Evan M. Kent

(57) ABSTRACT

A system for optimising the cycling conditions used to control a polymerase chain reaction assigns membership values for denaturation, annealing and extension events in order to determine the relative contribution of each event during the reaction, and using genetic algorithms to determine the optimum times required to complete each event.

9 Claims, 13 Drawing Sheets

Fig.4.
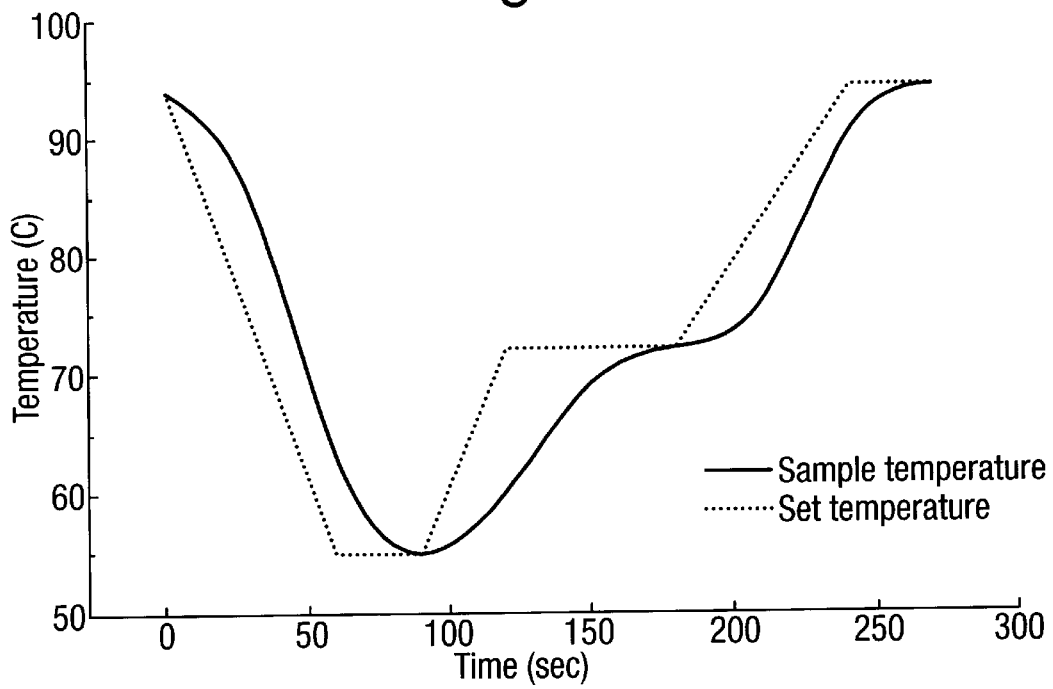
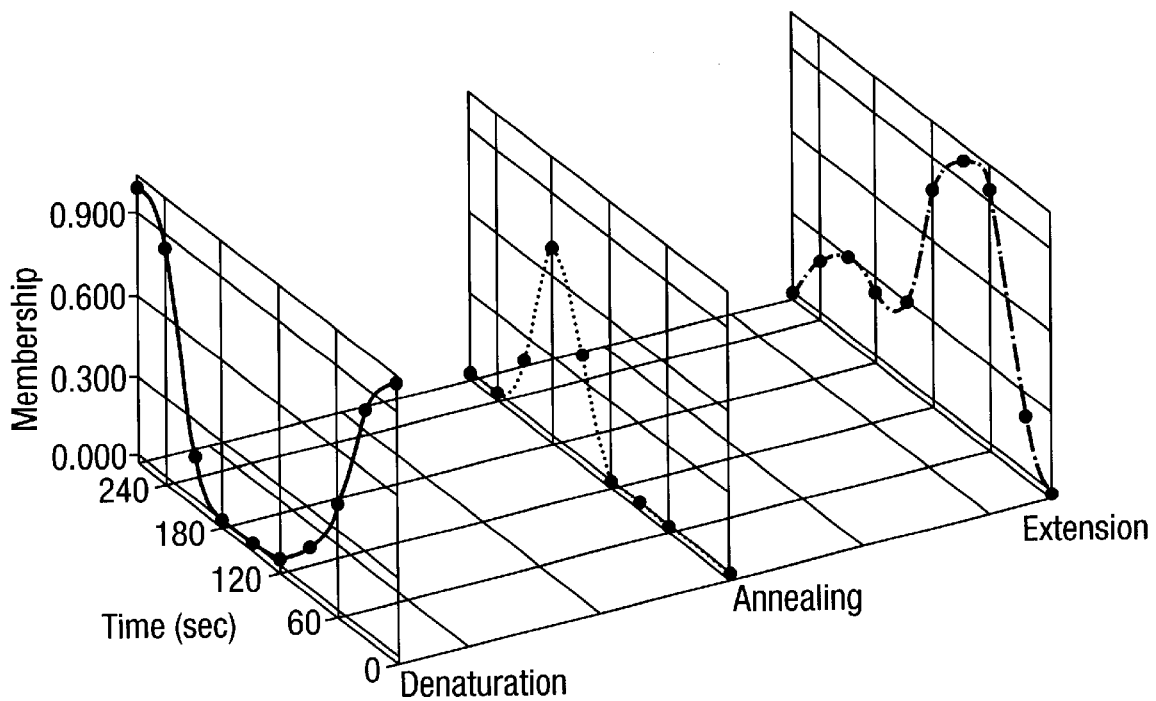

Fig. 7.
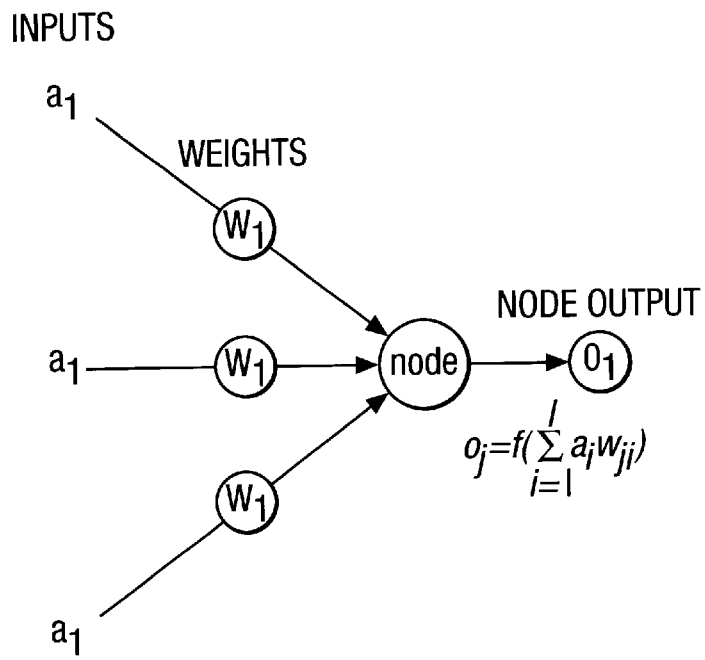
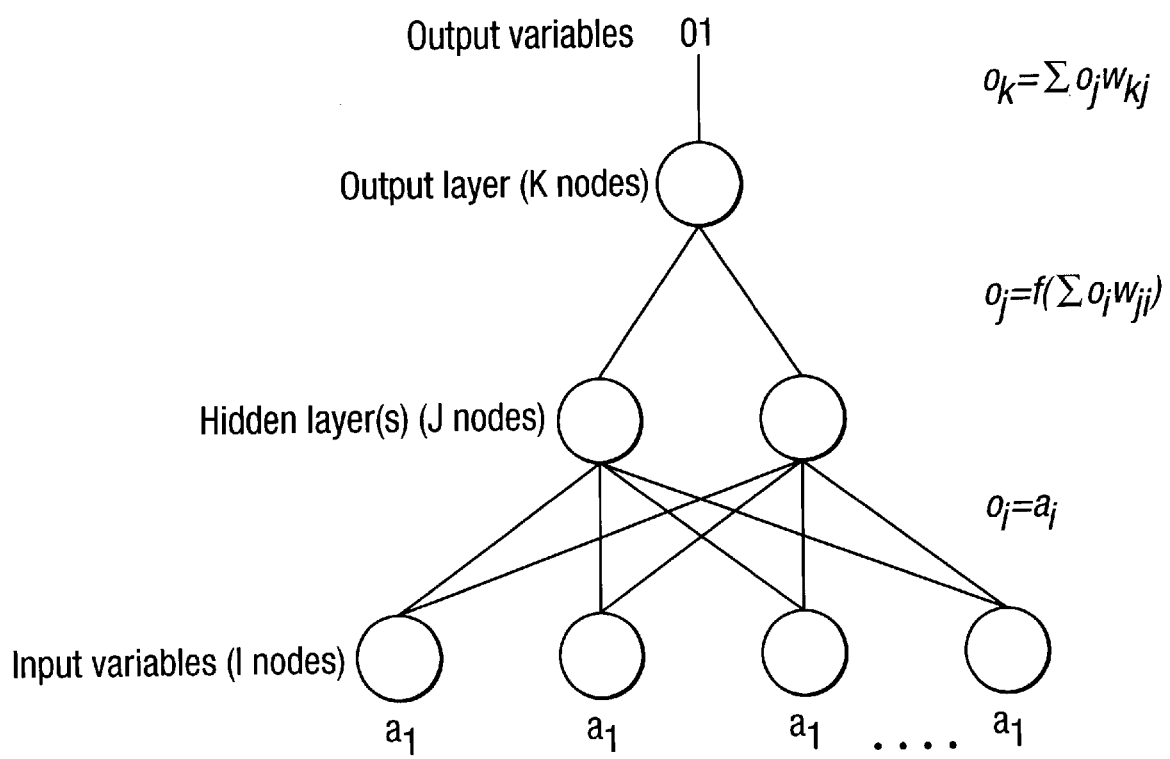

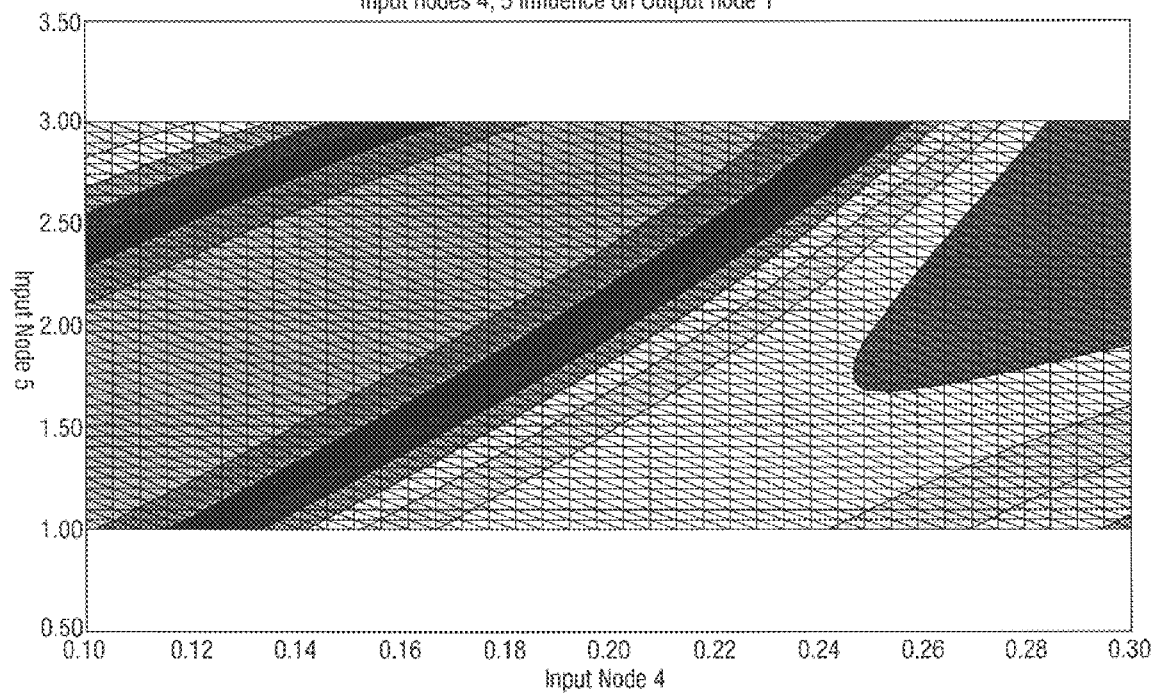

CONTROL OF NUCLEIC ACID AMPLIFICATION PROCEDURES INCLUDING THE POLYMERASE CHAIN REACTION (PCR)

The present invention relates to the optimisation of cycling conditions used to control polymerase chain reactions.

Optimisation of the temperature control used for PCR amplification requires careful consideration of reaction conditions. The complex nature of the reaction and the interactions between essential reaction components means that traditional kinetic methods of analysis cannot be readily applied to predict optimum cycling conditions. The process described here overcomes these problems by predicting the level of amplification using a novel combination of "grey-box" modelling, genetic algorithms and neural networks, to model and predict the level of amplification for defined sets of cycling conditions. This can be used to determine which parts of the temperature profile have greatest effect on the reaction. Genetic algorithms are used to model the effects changes in the temperature profile have on amplification. These algorithms can then be used to define temperature cycles that give increased reaction performance. Linking this modelling process with on-line monitoring of the amplification process, real-time optimisation of reactions is possible. This is of particular importance to quality control sensitive procedures such as PCR-based diagnostics.

U.S. Pat. No. 4,683,195 (Mullis et al., Cetus Corporation) discloses a process for amplification of nucleic acid by the polymerase chain reaction (PCR). Short oligonucleotide sequences usually 10–40 base pairs long are designed to flanking regions either side of the target sequences to be amplified. These primers are added in excess to the target sequence DNA. A suitable buffer, magnesium chloride ions, a thermostable polymerase and free nucleotides are also added.

A process of thermal cycling is used to amplify the DNA typically several million-fold. Amplification is facilitated through cycling temperature. The target DNA is initially denatured at 95° C. and then cooled to generally between 40° C. to 60° C. to enable annealing of the primers to the separated strands. The temperature is raised to the optimal temperature of the polymerase, generally 72° C., which extend the primer to copy the target sequence. This series of events is repeated (usually 20 to 40 times). During the first few cycles, copies are made of the target sequence. During subsequent cycles, copies are made from copies, increasing target amplification exponentially.

Describing PCR mathematically may not be possible using traditional kinetic notation because of the complex interactions between reaction components. (see "A simple procedure for optimising the polymerase chain reaction (PCR) using modified Taguchi methods" Cobb and Clarkson, (1994)Nucleic Acids Research. Vol.22, No.18, pp. 3801–3805). $Mg^{2+}$ and deoxynucleotide triphosphates have been shown to affect the efficiency of priming and extension by altering the kinetics of hybridisation and disassociation of primer-template duplexes at denaturing, annealing and extension temperatures. These components are also involved in altering the efficiency with which the polymerase recognises and extends such duplexes. Concentrations of $Mg^{2+}$ and deoxynucleotide triphosphates required for optimal amplification depends largely on the target and primer sequences, with the nucleotides at the 3' end of the primer having a major effect on the efficiency of mismatch extension. Certain mismatch nucleotide combinations may be amplified more efficiently under certain reaction conditions that others. The presence of excess $Mg^{2+}$ in a reaction may result in the accumulation of non-specific amplification products, and insufficient concentrations reduce product yield. In addition, deoxynucleotide triphosphates quantitatively bind $Mg^{2+}$ ions, so that any modification in dNTP concentration requires a compensatory adjustment of $MgCl_2$.

PCR optimisation conventionally requires repetitive trial-and-error adjustment of important reaction parameters. Reactions optimised in this way are generally not robust and are susceptible to small variations in the temperature profile and/or minor fluctuations in the composition of the reaction mixture. The complexity, and to a certain degree the uncertainty of the reaction, means that modelling is difficult. Where models have been proposed see: "Polymerase chain reaction engineering" Hsu et al., (1997). Biotechnology and Bioengineering, Vol 55, No.2. pp.359–366, important reaction elements have been ignored. Importantly, current models assume that denaturation, extension and annealing occur at fixed temperatures in the cycle, predominantly due to the way in which thermal cyclers are programmed with fixed temperatures for each of these principle events. However, this is an over simplification since the rate of these events is temperature dependent such that they occur over a wide temperature range.

Theoretically, amplification of specific template sequences should have an exponential function, i.e. under perfect conditions the amount of template amplified will double after each cycle of the reaction. However, the fidelity and rate of amplification is controlled by a complex interaction between the reaction components so that the theoretical optimum is never achieved. Under normal conditions, the accumulation of product becomes limited during the later cycles since the number of duplexes for extension exceeds the enzyme activity in the reaction. At this point, the accumulation of product becomes linear. This is compounded by thermal inactivation of the polymerase with prolonged exposure to temperatures in excess of 80° C. Amplification can be optimised by careful consideration of annealing temperatures, annealing times and annealing ramps. It is possible to increase the annealing temperature to avoid non-specific priming, by adjusting the ramp rate in order to compensate for the reduced rate of priming. This will increase the cycle range during which exponential accumulation of the target sequence occurs. The rate of priming and temperature range over which priming occurs will depend on the amount of free $Mg^{2+}$.

Similar optimisation of denaturation times and ramps will have an impact on amplification since Taq polymerase becomes denatured with excessive exposure to the high denaturation temperatures (typically $\geq 94°$ C. for 1 min to 5 min) (see: "Kinetics of inactivation for thermostable DNA polymerase enzymes" Mohapatra and Hsu, (1996), Biotechnology Techniques, Vol.10, pp.569–572). Although polymerase is normally added in excess, successive denaturation steps in the PCR have significant impact on the amount of polymerase denaturation. Additionally, these temperature conditions cause depurination of the DNA template (typically every 2 Kb at 94° C. $min^{-1}$). Since denaturation occurs before and after the set denaturation temperature has been achieved (typically DNA denatures with increasing velocity between 70° C. and 90° C.), modification of ramp times can be used to limit the times at 94° C. Polymerases such as Taq have been well characterised. They show classic temperature dependency, with a gradual increase in extension rate at high temperatures. Activity reaches an optimum (typically ≈70° C.), after which activity drops sharply (typically ≧80° C.). Extension will occur over an extended temperature range. It is possible to reduce extension times by consideration of the total amount of extension over this range. For example, a significant amount of extension will occur at ca. 60° C. Oligonucleotides that hybridise at this temperature will be extended immediately. Extension times can be reduced, or in some instances eliminate altogether.

The present invention seeks to provide optimisation of cycling conditions used to control polymerase chain reactions.

According to an aspect of the present invention there is provided a method of optimising the cycling conditions used to control a polymerase chain reaction as specified in claim The preferred embodiment provides a process which allows intelligent control of the PCR. This is achieved by modelling and predicting levels of amplification through a novel combination of membership function assignment (association of reaction events with temperature), genetic algorithms and artificial neural networks. Here, the membership component infers and provides a crisp definition for the various reaction parameters that determines the degree of amplification for a specific reaction. Genetic algorithms are used to determine the optimum times for each step of temperature cycle. The neural network component is then used to enhance the membership rules and membership functions. After an initial training, the neural network can be used to update the membership functions as it learns more from its input signals. This process may be used to accurately predict optimum reaction conditions (FIG. 1).

Preferably, the process is used to transfer protocols from one thermal cycler to another, wherein the relative contributions of denaturation, annealing and extension are first calculated taking into account the thermal performance of the source cycler, and then transferred to the target cycler by taking into account the differences in cycler performance.

An embodiment of the present invention is described below, by way of example only, with reference to the accompanying drawings, in which:

FIG. 4 shows examples of modelling of PCR amplification using membership functions for destination, annealing and extension;

FIG. 5b shows the operation of the genetic algorithm of FIG. 5a;

FIG. 7 is a schematic representation of a mode in an artificial neural network and a three layer artificial neural network;

FIGS. 9 to 15 show the results relating to the preferred method.

Figure 1:
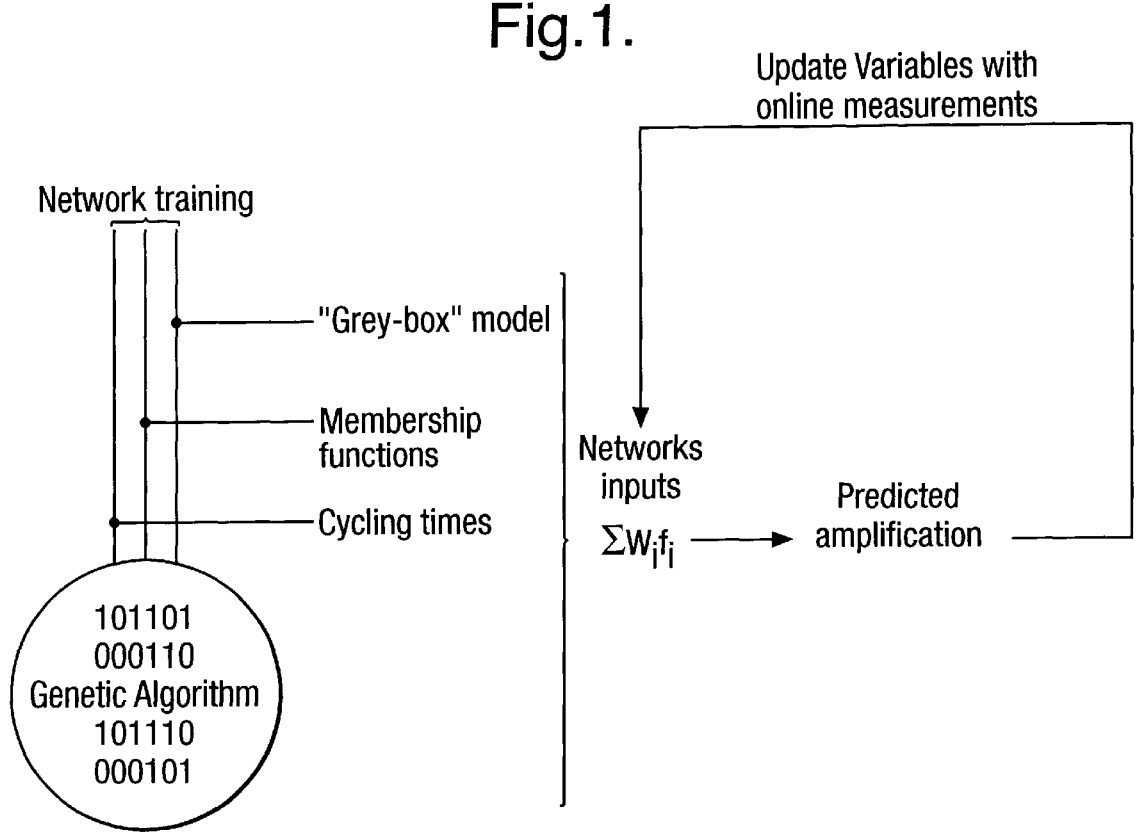
FIG. 1 is a schematic representation of "intelligent" thermal cycler control using membership functions for specific reaction events and genetic algorithms to predict levels of amplification for set cycling conditions.

New technologies for monitoring the progress of PCR in real-time (e.g. fluorogenic 5' nuclease chemistries—PE Applied Biosystems and ethidium bromide fluorescence (see "Kinetic PCR analysis Real-time monitoring of DNA amplification reactions" Higuchi et al., (1993), Biotechnology. Vol.11,pp.1026–1030) have been recently described. Although these methods allow the quantification of product formed during the course of a reaction, the main benefits of real-time monitoring will come from algorithms that can accurately predict and maintain optimal amplification. The process described in this application can be used in conjunction with product detection systems to provide real-time dynamic control of PCRS; continuously updating cycling conditions as the reaction proceeds, maintaining optimum performance.

PCR conditions generally need careful consideration in order to optimise the level of amplification. However, since the polymerase chain reaction is complex, traditional kinetic methods of analysis cannot easily be used to predict optimum conditions. This is compounded by the complex interaction between the reaction components. The preferred embodiment seeks to overcome the problems traditionally associated with PCR optimisation by predicting the level of amplification by calculating the amount of denaturation, annealing and extension over the entire range of temperatures in the cycling profile. Using a novel combination of "grey-box" modelling that applies membership functions to each of these events, genetic algorithms and artificial neural networks, the level of amplification can be predicted. Analysis of the weights generated by the neural network can then be used define reaction optima in terms of the time taken for each of the cycling events. The process can be described by the following;

i. Grey-box modelling is used to define optimum annealing, extension and denaturation temperatures and the temperature range over which these events occur.

ii. Membership functions are applied to each of these events to predict level of amplification over a given cycle.

iii. Genetic algorithms are used to determine optimum times for each of these stages.

iv. Neural networks may be used to confirm and/or modify predicted level of amplification.

V. Real-time monitoring may be used to refine the process further.

This approach provides the basis of a PCR specific control software that can be applied to standardisation thermal cycler control and is the first description of an intelligent control process for PCR optimisation.

Defining Membership Functions

The basis of the preferred process involves converting important elements of the PCR (denaturation, annealing and extension), into a series of membership functions. "Grey-box" modelling of the reaction is initially used to generate the series of membership functions and rules for the various parameters that affect reaction performance; i.e. factors that influence template denaturation, primer annealing and extension of the primer/template duplex. A rule base is used to associate these events with specific temperatures in the amplification cycle. Crisp values for each reaction variable are used to predict the level of amplification over single or multiple cycles. By using membership functions it is possible to model dynamically the PCR and take into account changes in the rate of the various processes over the whole temperature cycle and not at specific stages as with conventional modelling methods.

Figure 2:
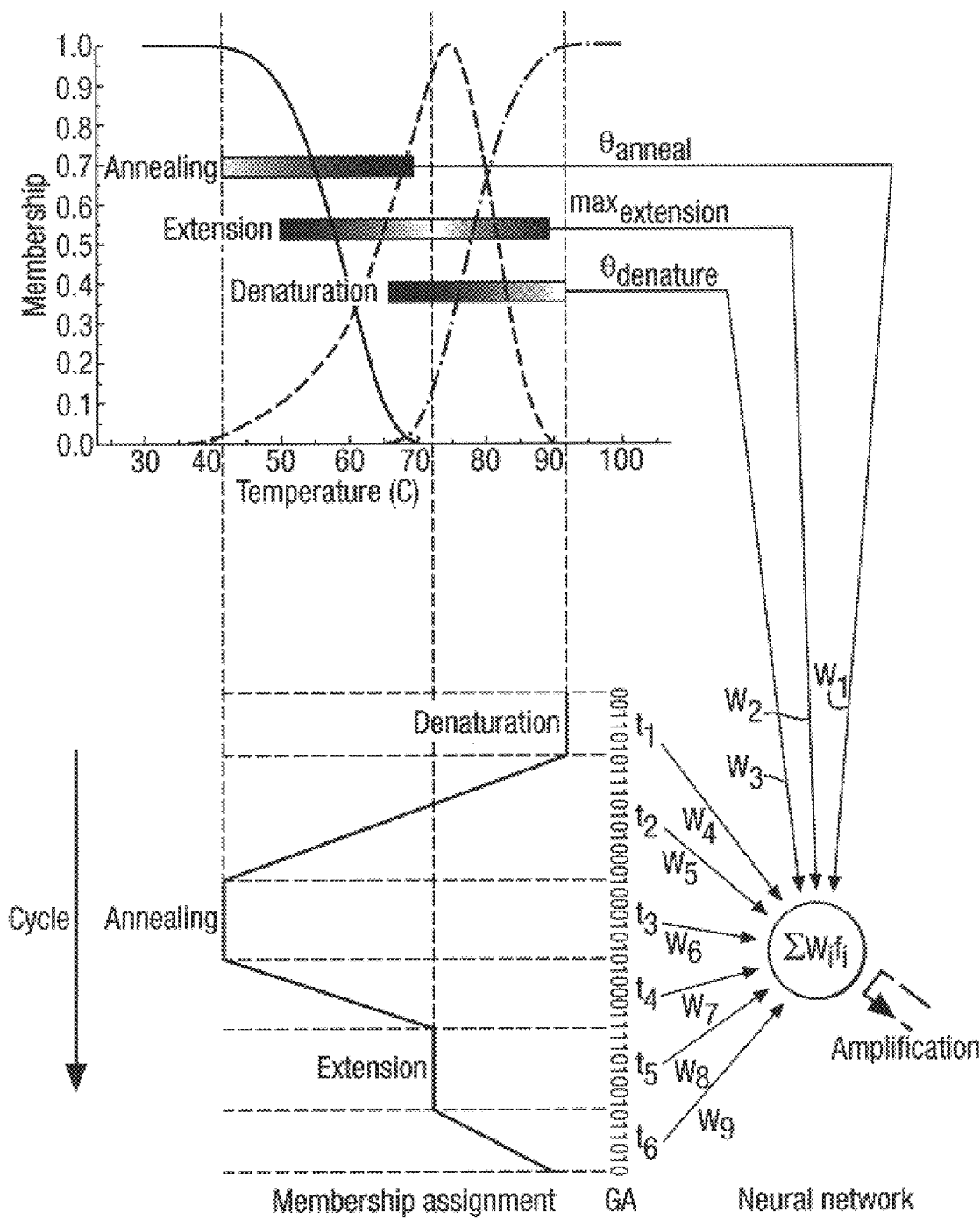
FIG. 2 shows the prediction of amplification levels using a self-learning control process.

PCR can be considered to comprise three principle events; namely, denaturation of the double stranded template, annealing of the primers to the single stranded denatured template, and polymerisation of these duplexes. The rate at which these processes occur is temperature dependent. Interactions between various elements in the reaction are additional regulators of rate and optima. "Grey-box" modelling of these processes allows membership functions for these events to be associated to specific temperatures (FIG. 2). Genetic algorithms can be used to modify the time allocated for each stage (t1 . . . t6) to optimise amplification and limit the effects of component interactions, inactivation, depurination, etc. The neural network element is used to learn what initial times to use in order to reduce the time taken to calculate the stage optima.

Denaturation Membership Functions

Denaturation of DNA template can be represented by a sigmoidal melting curve. The denaturation temperature of that template defines the temperature at which half the DNA is denatured. Little denaturation occurs below 70° C. Increasing the temperature above this results in a marked increase in the rate of denaturation. These high temperatures are also associated with an increase in the rate of enzyme inactivation and depurination of the template. Principally, denaturation occurs over a range of temperatures during cycling; i.e. during ramping up to, ramping down from, and during the assigned denaturing temperature. Denaturation times may be significantly reduced by calculating the rate of denaturation before, during and after the specified denaturation temperature has been attained. This minimises the level of enzyme inactivation and the amount of template depurination. Consequently, the efficiency of amplification can be increased.

Figure 3:
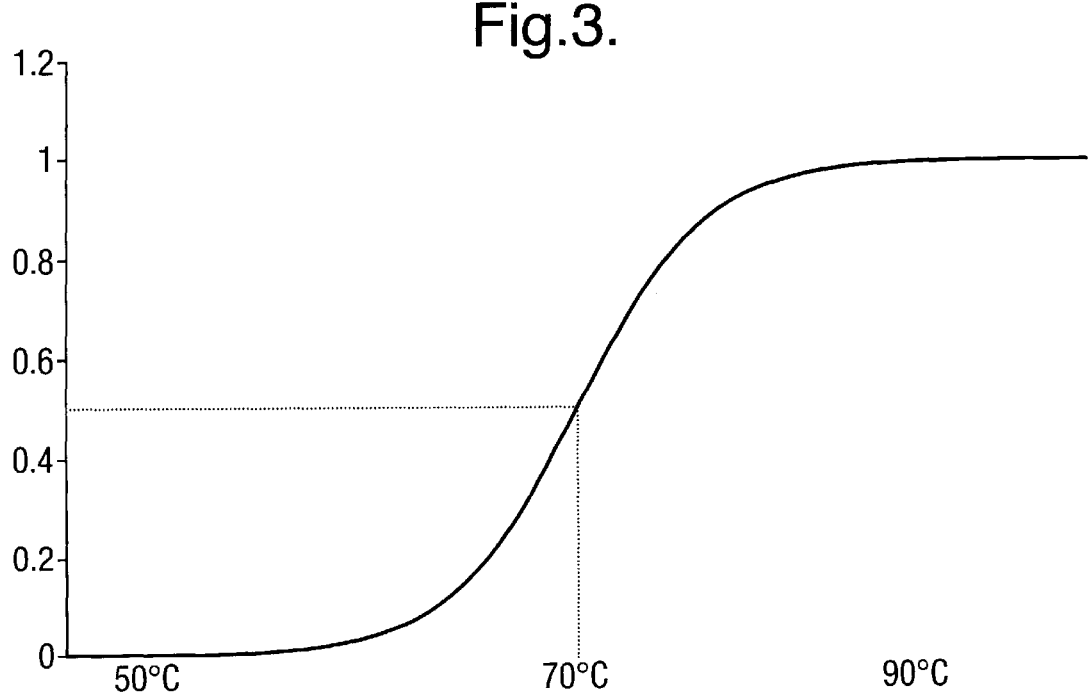
FIG. 3 shows a sigmoidal membership function for template destination.

Co-operative interactions between the stacked hydrogen-bonded base pairs of the double stranded template are progressively disrupted during melting until the two strands are completely separated. Membership functions ($M_{denature}$) for template denaturation can therefore be defined by a sigmoidal curve (FIG. 3) with gain $q_{denature}$ and midpoint $S(x)_{denature}$ that is defined by predicted $T_m$ and optimum denaturation temperature of the template molecules. Gain $q_{denature}$ and midpoint s $(x)_{denature}$ are used as modifiers of the neural network component. Generalised curves may also be used to define memberships for denaturation (e.g. boolean, trapezoidal, triangular and kinetic). Typically, native DNA with AT and GC base pairs have $T_m$'s of 72° C. Poly(AT) templates have $T_m$'s ca. 60° C. and poly (GC) templates have $T_m$'s ca. 90° C.

Annealing Membership Functions

Annealing membership defines the rate of hybridisation of primer to template. Initially the priming temperature $T_p$ (or $T_m$–5° C.) is used to define optimum hybridisation depending on the length of primer. Typically, $T_p$ and $T_M$ are calculated from one of the following equations;

$$T_p=[22+1.46 \cdot (2 \cdot GC+AT)]$$

$$T_m=81.5+16.6 \cdot \{(\log_{10} [J^{+1)+}0.41 \cdot (\%G+C)-(600/1)-0.63\ (\%FA) \}$$

$$T_m=81.5+16.6 \cdot \{(\log_{10} [J^+])+0.41 \cdot (\%G+C)-675/1\}$$

$$T_m=[(A+T) \cdot 2°\ C.] +[(G+C) \cdot 4°\ C.]$$

where $J^+$ is the concentration of monovalent cations, l is the oligonucleotide length and FA is formamide. Membership functions for hybridisation ($M_{anneal}$) are represented by sigmoidal curves (FIG. 3) whose maxima are defined by the primers $T_p$ or $T_m$–5° C. Generalised curves may also be used to define memberships (e.g. boolean, trapezoidal, triangular and kinetic). The temperature ranges over which annealing occurs will depend on the concentration of free magnesium ions in the reaction mixture. Midpoint $s(x)_{anneal}$ and gain $q_{anneal}$ define the temperature range over which annealing takes place and are strongly associated with the concentration of free $Mg^{2+}$ions in the reaction. Gain $q_{anneal}$ and midpoint $s(X)_{anneal}$ are used as modifiers of the neural network component.

Extension Membership Functions

The dependency of Taq activity on temperature has previously been described in detail by other workers (see "Deoxyribonucleic acid polymerase from the extreme thermophile THERMUS aquaticus", Chien et al., (1976). Journal of Bacteriology.vol.127, No.3, pp. 1550–1557). Membership functions for the polymerisation of duplexes is represented by a curve whose maximum is defined by the temperature optimum. This will depend on the specific polymerase used and is generally in the region ca. 70° C. Generalised curves may also be used to define memberships (e.g. boolean, trapezoidal, triangular and bell).

FIG. 4 shows the values of reaction memberships $M_{denature}$, $M_{anneal}$ and $M_{extension}$ over a single PCR cycle for sample tube temperatures at time t seconds. Adjustment of time t between and during these cycle events can be used to optimise the amount of amplification achieved. Factors reducing amplification (e.g. depurination, inactivation of Taq polymerase, etc) are reduced through the optimisation process since optimisation presupposes a reduction in these events. Neural net algorithms are used to determine which of these events have greatest influence on the outcome of the reaction.

Determination of Optimum Profile Times Using Genetic Algorithms

Since changes in any one of the times set for denaturation, annealing and extension will alter the level of amplification, strategies for reaction optimisation are not obvious or computationally intensive. The process described here uniquely uses genetic algorithms to overcome these problems. A population of potential solutions to the problem are maintained and repeatedly updated according to the principles of evolution, i.e. selection, mutation and/or recombination (crossover). Recombination selects pairs of solutions in the population (parents) and generates a series of new solutions (children) by combining elements from their parents, which are then inserted into a new population of solutions. The principle of selection demands that "good" solutions be preferentially chosen over "bad" solutions. This is achieved by defining a fitness function that assigns a number to each solution according to how "good" it is. Selection guarantees that only solutions (chromosomes) with best fitness will propagate in future populations. Mutation is used modify solutions in the population without interaction with the rest of the population. Genetic algorithms therefore search for sets of alleles which, together, produce good solutions (co-adapted alleles).

A general definition of genetic algorithms does not exist. They can be represented by an abstraction of the work of Holland (See "Adaptation in natural and artificial systems". Holland, (1975). The University of Michigan Press; Ann Arbor) . A schematic of the genetic algorithm used in this process is given in FIG. 5 and is represented by the following steps;

i. Initialisation. The initial population of chromosomes (typically n=25 . . . 100), is created either randomly, or by "shuffling" an input chromosome generated from the artificial neural network element described later. This reduces the time taken by the algorithm in searching for optima.

ii. Evaluation. The fitness of each chromosome is evaluated. In this case, the amount of amplification is calculated using the membership functions described earlier and the cycle times assigned by individual chromosomes. These are then assigned fitness functions, which numerically encodes the performance of each chromosome.

iii. Exploitation. Chromosomes with the highest fitness score (i.e. the highest predicted amplification for the shortest step time), are placed one or more times into a mating subset in a semi-random fashion. Two chromosomes are drawn at random from the population. The chromosome with the highest fitness score is placed into a mating subset. Both chromosomes are returned to the population and the selection process is repeated until the mating subset is full. This ensures that chromosomes with low fitness are removed from the mating population. The chance of selection as a parent is proportionate to chromosomes normalised fitness. This means that better chromosomes will generally produce more children. However, the stochastic nature of the process means that occasionally poor solutions will produce children. The addition of elitism functions is also beneficial. Here, the single best solution in any parent generation is copied unmodified into the child generation; all other children are generated as normal.

Figure 5A:
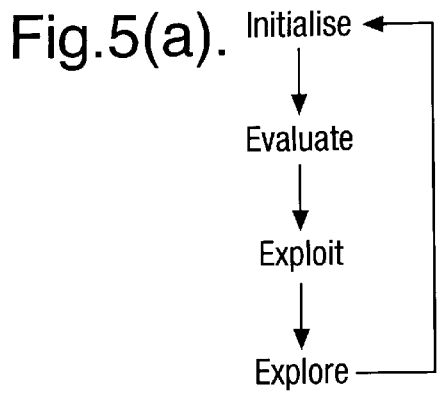
FIG. 5a is a schematic diagram of the key events in the preferred genetic algorithm.
Figure 5B:
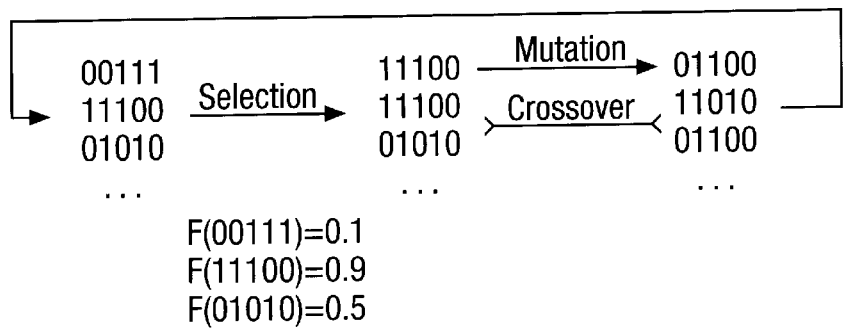

IV. Exploration. This uses recombination and mutation operators to modify chromosomes in the next generation of chromosomes (FIG. 5). Two chromosomes from the mating subset are randomly selected and mated. The probability of mating is a controllable function and is generally given a high value ($\approx 0.90$). A recombination operator is used to exchange genes-between the two parent chromosomes, to produce two children. In FIG. 5, a population of three individuals is shown. Each is assigned a fitness function F. On the basis of these fitnesses, the selection phase assigns the first individual O copies, the second 2 copies and the third 1 copy. After selection genetic operators are applied probablistically; the first individual has its first bit mutated from a 1 to a 0, and crossover combines the second two individuals into new ones. (Modified from Forrest (1993). Science, Vol.261, pp.872–878).

Figure 6A:
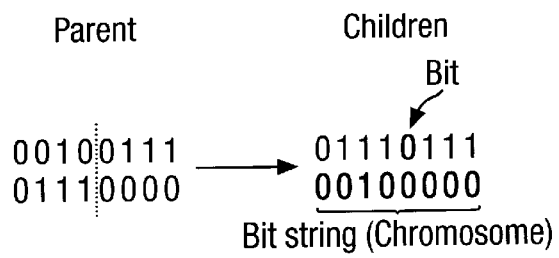
FIGS. 6a and 6b show, respectively, examples of one-point and two-point cross-over.
Figure 6B:
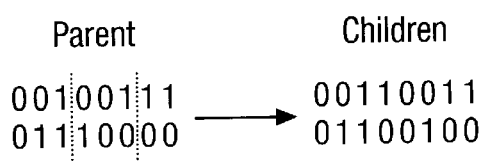

Recombination may involve one-point and/or two-point crossovers (FIG. 6). Where one-point crossover is used, a crossover point is selected along the chromosome and the genes up to that point are swapped between the two parents. Where two-point crossover occurs, two crossover points are selected and the genes between the two points are swapped. Other crossover algorithms such as partially mapped crossover (PMX), order crossover (OX) and cycle crossover (CX) may also be used. All children are produced by crossover of two parents; two children are produced simultaneously. The children then replace the parents in the next generation. Mutation of single genes is another controllable function. Mutation rates are generally assigned a low probability ($\approx 0.001$), and can be defined$(N*L^{1/2})^{-1}$, where N is the population size and L is the length of chromosome.

V. This sequence of events is repeated for a fixed number of generations until convergence occurs. Crowding replacement may be used to reduce the problem of premature convergence. A child is compared with a number of existing parents and replaces a parent most similar to itself. Essentially crowding replacement replaces like with like, this allows sub-populations to explore various parts of the genetic search space. This is particularly useful for multi-modal search spaces where there are a number of scattered fitness maxima.

The basic structure of the genetic algorithm used can be formalised as;
Initialise population
Evaluate chromosomes
Calculate normalised fitness
For each successive generation
{
  Generate and evaluate candidate replacements
  Replace numbers of the populations with candidates
  Re-evaluate unchanged members
  Normalise fitness
  Output statistics on population
}

Each time in the cycle profile (Allele; $t_1 \ldots t_6$) is converted into bits I=$\{0,1\}^1$ according to the min/max time allowed for specific stages in the cycle, and the required time resolution (Table 1)[1]. These are then grouped together to form bit strings (chromosomes) representing the total time profile of a single cycle. Initially a random population of strings is created according to the minimum and maximum times allowed for each stage. The neural network may be used after training to set initial times according to the membership functions assigned for denaturation, annealing and extension steps. (Note: Traditional binary encoding has a draw back in that in certain instances all bit must be changed to alter the number by 1. This makes in difficult for an individual that is close to an optimum to move closer by mutation. The use of Gray codes is preferred since incrementing or decrementing any number by 1 is always a one-bit change.)

TABLE 1

Bit data encoding $t_6$, the time taken for the thermal cycler to heat from annealing (72° C.) to denaturation (94° C.). The maximum allowable time is set at 120 seconds (5° C. sec$^{-1}$ ramp).

| Resolution | Bit Size | Bit data | $\Sigma$ ($t_1 \ldots t_6$) |
| --- | --- | --- | --- |
| 1 sec | 7 bit | 1111000 | 42 bit |
| 2 sec | 6 bit | 111100 | 36 bit |
| 5 sec | 5 bit | 11000 | 30 bit |
| 10 sec | 4 bit | 1100 | 24 bit |

The minimum times for each event in the cycle are fixed by the performance of the thermal cycler. Generally, minimum ramp rates are set between 0.5° C. sec$^-$and 1° C. sec$^{-1}$. Maximum ramp rates generally do not need to be set higher than 5° C. sec$^{-1}$. The maximum time for cycle events will therefore depend on the ramp rate and the temperature difference between successive steps.

Amplification is modelled using the time profiles designated by each chromosome in the population and the membership functions described earlier. Fitness is scored based on maximum amplification achieved using the shortest time possible, and in maintaining minimum exposure to extremes of the temperature profile which may promote mispriming, inactivation and depurination. Under certain circumstances, it may be beneficial to define other fitness characteristics (e.g. with RAPDS, differential display, etc it may be necessary to promote mispriming events). Once all individuals in the population have been evaluated, their fitnesses are used as the basis of exploitation and exploration to select chromosomes for subsequent rounds of selection. After a specified number of iterations, the optimum time profiles are highly represented in the chromosome population.

Neural Network Selection

Figure 8:
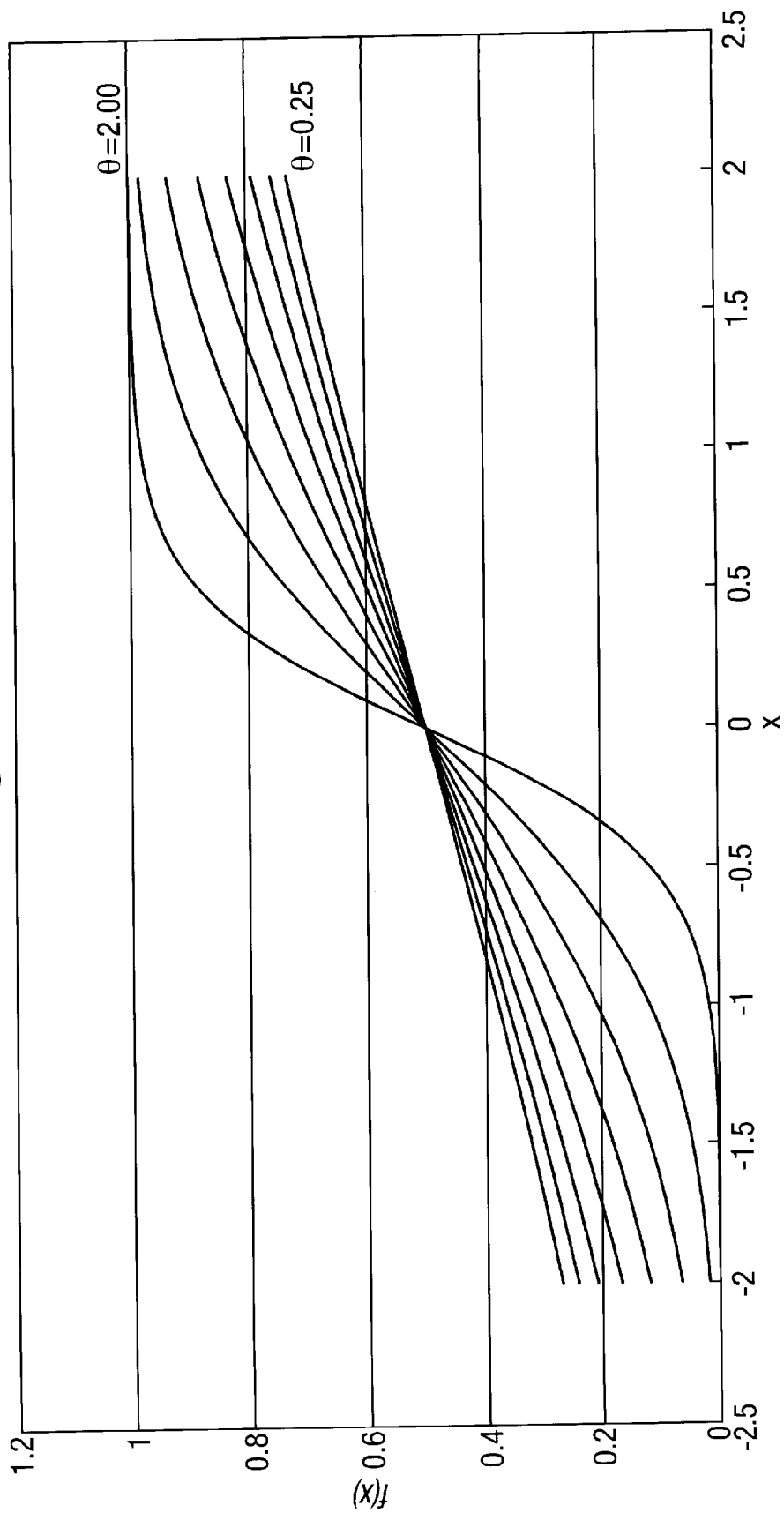
FIG. 8 shows a sigmoid transfer function with sigmoid gains of 0.25 to 2.00.
Figure 9:
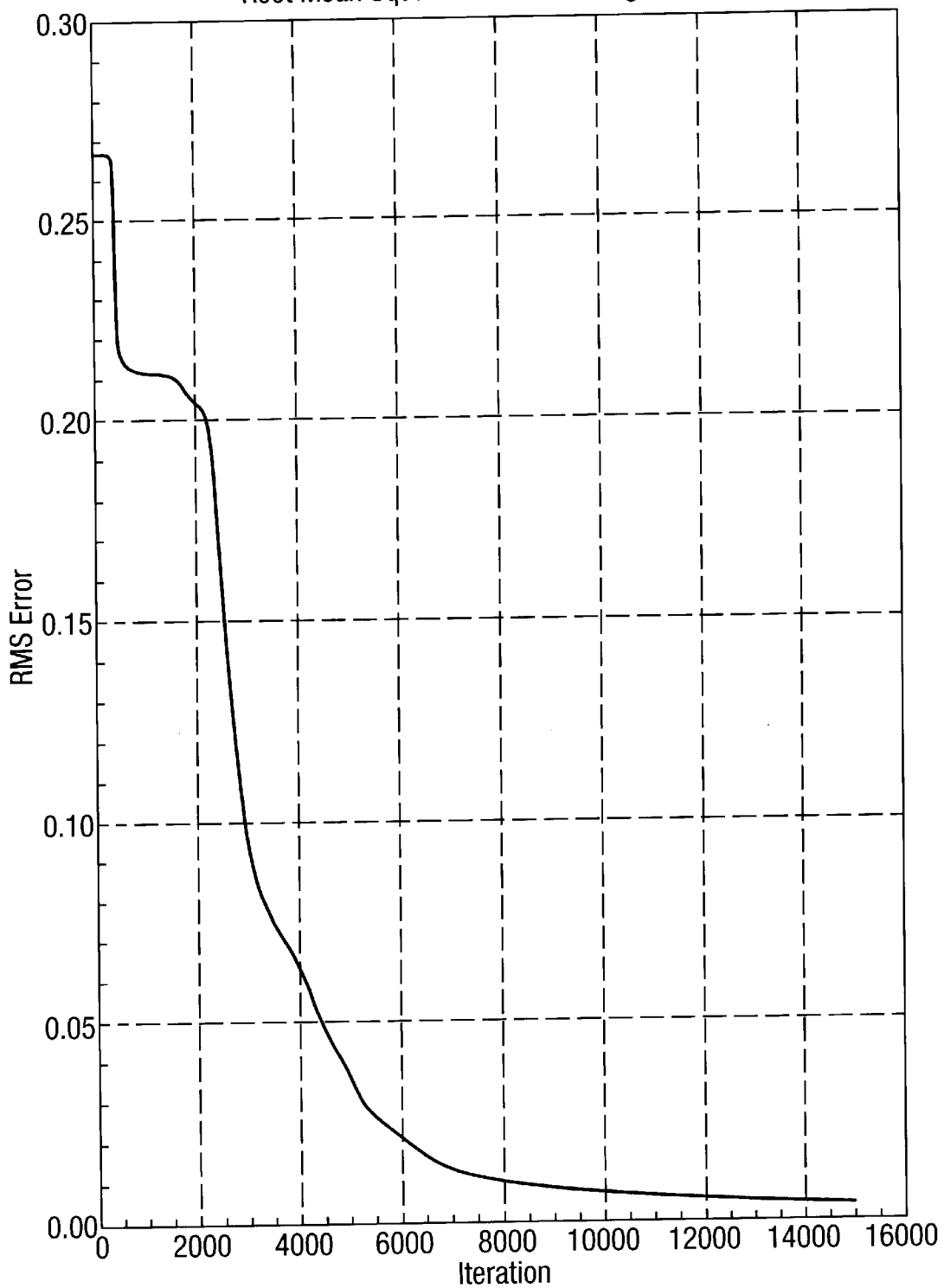
Figure 10:
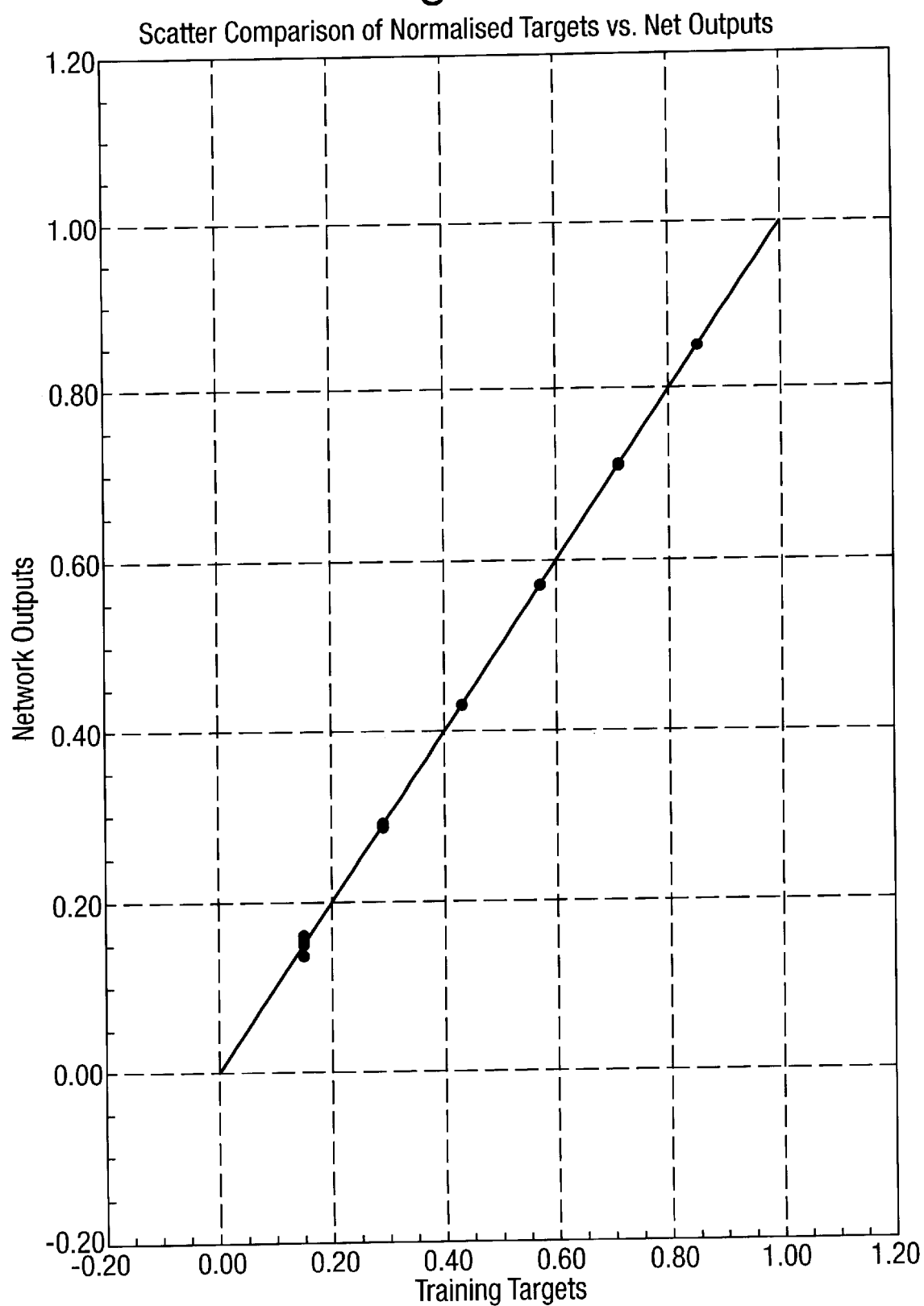
Figure 11:
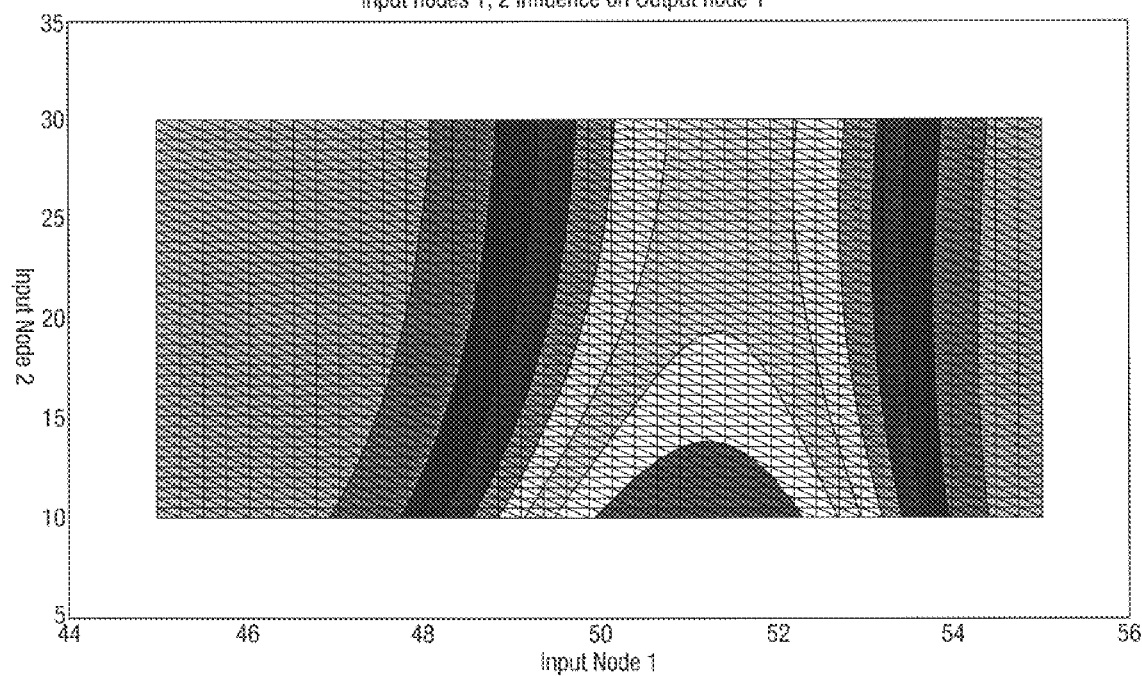
Figure 12:
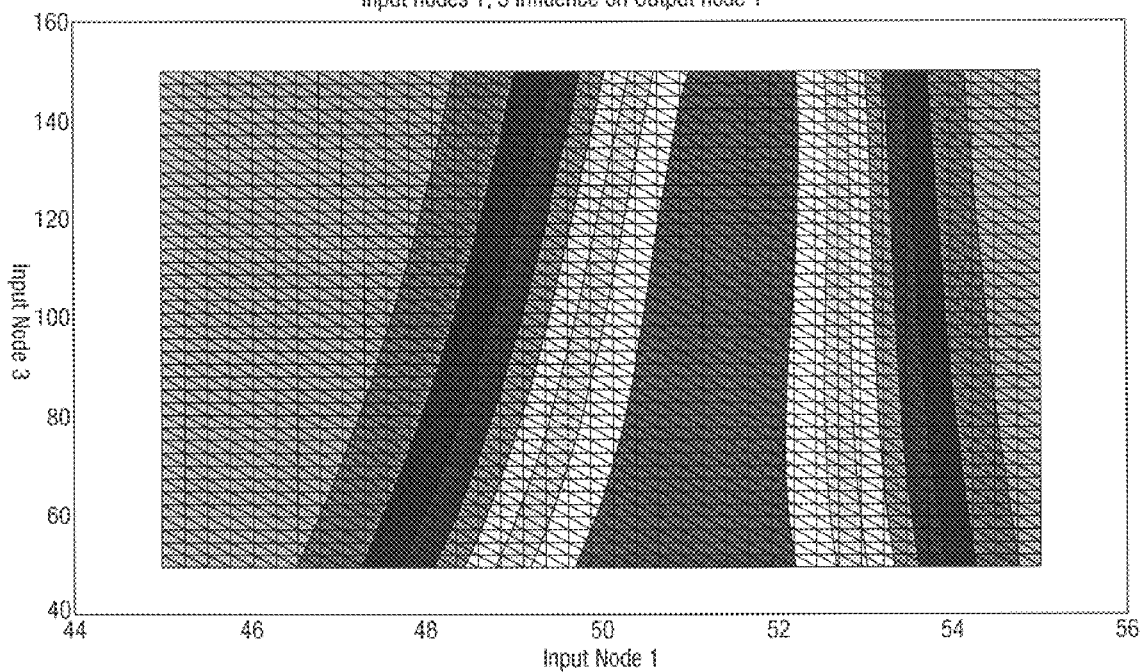
Figure 13:
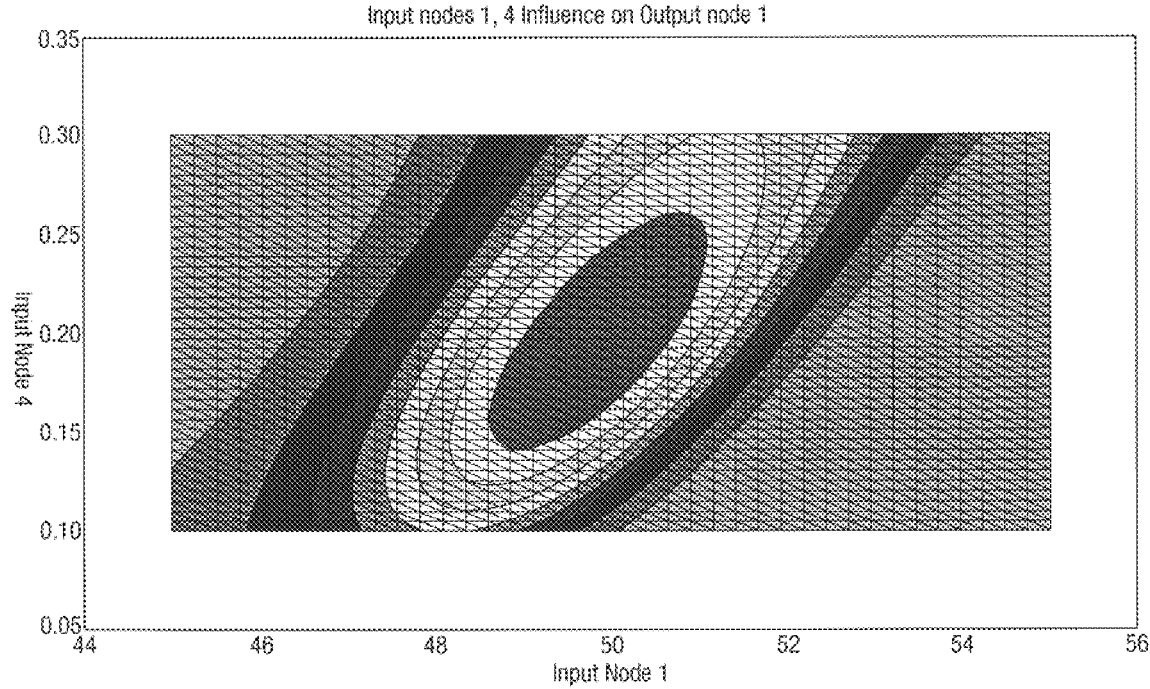
Figure 14:
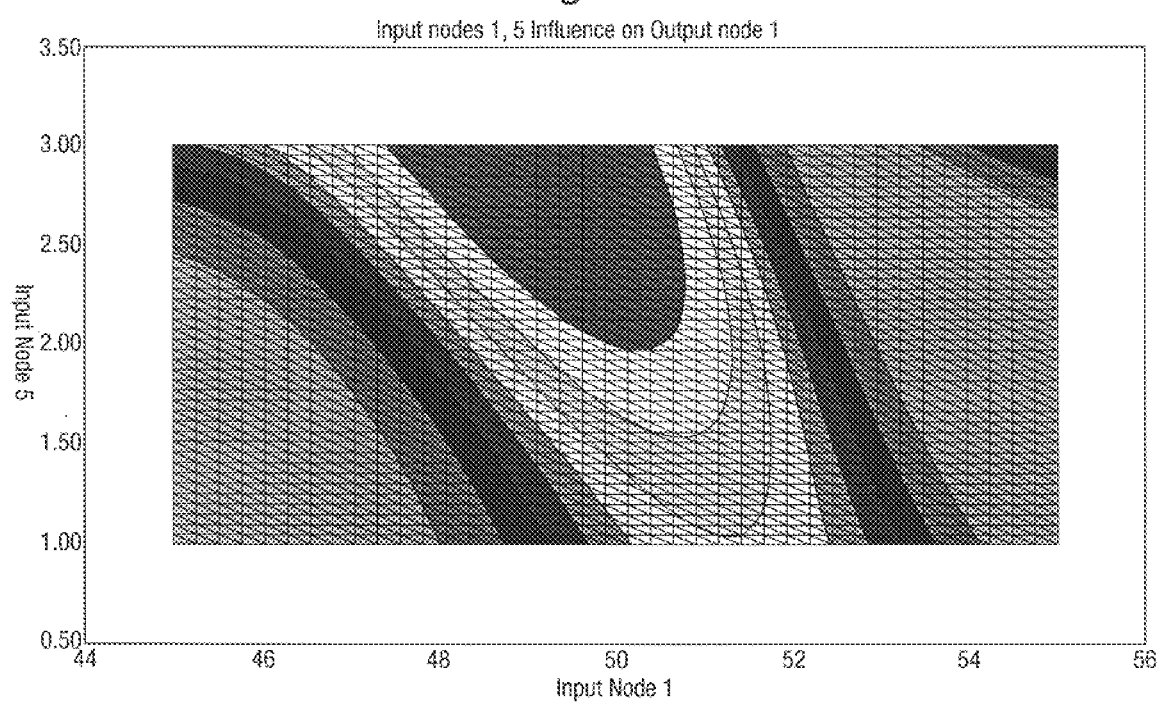

This application uses a feed-forward neural network with an input layer, one or more hidden layers and an output layer (FIG. 7). Each node has a series of weighted inputs $w_i$, representing external signals or the output from other nodes. The number of hidden nodes is an adjustable parameter. The sum of the weighted inputs is transformed using a non-linear sigmoidal transformation function;

$$f(x) = \frac{1}{1 + e^{-x/\theta}}$$

where f(x) has the range 0 to 1, x is the weighted sum of the inputs, and q is the gain. Modification of q alters the shape of the curve. A small value for q gives the sigmoidal function a steep slope (e.g. q=1.0). Conversely, a large value for q gives the curve a shallow slope (e.g. q=2.0). Inputs represent transition times for temperature-controlled events and the temperature ranges of those events (FIG. 8). There is one input node per variable. The input nodes transfer the weighted input signals to the nodes in the hidden layer. A connection between node i in the input layer and node j in the hidden layer is represented by the weighting factor $w_{ji}$. Hence, there is a vector of weights, $w_j$, for each of the J nodes in the hidden layer. These weights are adjusted during the training process. Each layer also has a bias input to accommodate for non-zero offsets in the data. The value of the bias is always initially set to zero. A term is included in the vector of weights to connect the bias to the corresponding layer. This weight is also adjusted during the training period. Other functions (Tan h, sin, cosine, linear, etc) may be used.

During an initial training procedure, a series of input patterns with their corresponding expected output are presented to the network in an iterative fashion while the weights are adjusted. This is continued until the desired level of perception between expected observed outputs has been achieved. Different learning algorithms can be used, however back-propagation is currently the algorithm of preference. The error in the expected output is back propagated through the network using the generalised delta rule to determine the adjustment to the weights (see "Parallel distributed processing explorations in the microstructure of cognition". Part 1. Rumelhart and McClelland, (1986) MIT Press: Cambridge, Mass.). The output layer term is given by;

$$\delta_{pk} = (t_{pk} - o_{pk}) o_{pk} (1 - o_{pk})$$

where $\delta_{pk}$ is the error term for the observation p at output node k, $t_{pk}$ is the expected output for observation p, and $o_{pk}$ is the actual node output. $o_{pk}(1-o_{pk})$ is a derivative of the sigmoidal function. The error term at node j of the hidden layer is the derivative of the sigmoid function multiplied by the sum of the products of the output error terms and the weights in the output layer;

$$\delta_{pj} = o_{pj}(1 - o_{pj}) \sum_{k=1}^{K} \delta_{pk} w_{kj}$$

The error terms from the output and hidden layers are back propagated through the network by adjusting the weights of their respective layers. Weight adjustments, or delta weights, are calculated according to;

$$\Delta w_{ji}(n) = \eta \delta_{pj} o_{pi} + \alpha \Delta w_{ji}(n-1)$$

where $\Delta w_{ji}$ is the change in the weight between node j in the hidden layer and node i in the input layer, $\eta$ is the learning rate, $\delta_{pj}$ is the error term for observation p at node j of the hidden layer, $o_{pi}$ is the observed output for node i of the input layer for observation p, and $\Delta$ is the momentum. The terms n and n-1 refer to the present iteration and the previous iteration, respectively. The presentation of the entire set of p training observations is repeated when the number of iterations, n, exceeds p. A similar method is used to adjust the weights connecting the hidden layers of nodes to the next hidden layer, and between the final hidden layer and the output layer. All weights are initially given random values prior to training.

The neural net algorithms are used to associate membership functions with time profiles that define each amplification stage. After training, this procedure can be used to predict the level of amplification with a high degree of accuracy. Comparison of predicted amplification levels with real-time monitoring could be used to optimise reactions further.

The methods described by B. D. COBB, J. M. CLARKSON:, "A simple procedure for optimising the polymerase chain reaction (PCR) using modified Taguchi methods", NUCLEIC ACIDS RESEARCH, 1994, vol. 22, no. 18, pages 3801–3805 provide a rapid method for evaluating the effects of various reaction components on the level of amplification obtained from a reaction. This can be used to train the neural network element of this process. The neural network takes key information from the reaction to predict amplification levels. A five input network with two hidden layers using a 5,5,3,1 format was used to predict amplification from annealing temperature, template, primer, dNTP and $Mg^{2+}$ concentration data. 27 training reactions were performed using conditions described in Table 2.

TABLE 2

Reaction conditions amplification levels used to train a 4 layer neural network with 5 input nodes, two hidden layers with 5 and 3 nodes, and a single output layer.

| Reaction | Temp (° C.) | Primer (mM) | Template (ng) | dNTPs (mM) | $Mg^{2+}$ (mM) | Amplification |
|---|---|---|---|---|---|---|
| 1 | 45 | 10 | 50 | 0.1 | 1 | 2 |
| 2 | 45 | 10 | 100 | 0.2 | 2 | 2 |
| 3 | 45 | 10 | 150 | 0.3 | 3 | 5 |
| 4 | 45 | 20 | 50 | 0.2 | 3 | 5 |
| 5 | 45 | 20 | 100 | 0.3 | 1 | 0 |
| 6 | 45 | 20 | 150 | 0.1 | 2 | 0 |
| 7 | 45 | 30 | 50 | 0.3 | 2 | 0 |
| 8 | 45 | 30 | 100 | 0.1 | 3 | 0 |
| 9 | 45 | 30 | 150 | 0.2 | 1 | 0 |
| 10 | 50 | 10 | 50 | 0.1 | 1 | 2 |
| 11 | 50 | 10 | 100 | 0.2 | 2 | 3 |
| 12 | 50 | 10 | 150 | 0.3 | 3 | 4 |
| 13 | 50 | 20 | 50 | 0.2 | 3 | 1 |
| 14 | 50 | 20 | 100 | 0.3 | 1 | 3 |
| 15 | 50 | 20 | 150 | 0.1 | 2 | 4 |
| 16 | 50 | 30 | 50 | 0.3 | 2 | 5 |
| 17 | 50 | 30 | 100 | 0.1 | 3 | 4 |
| 18 | 50 | 30 | 150 | 0.2 | 1 | 3 |
| 19 | 55 | 10 | 50 | 0.1 | 1 | 0 |
| 20 | 55 | 10 | 100 | 0.2 | 2 | 1 |
| 21 | 55 | 10 | 150 | 0.3 | 3 | 5 |
| 22 | 55 | 20 | 50 | 0.2 | 3 | 5 |
| 23 | 55 | 20 | 100 | 0.3 | 1 | 0 |
| 24 | 55 | 20 | 150 | 0.1 | 2 | 2 |
| 25 | 55 | 30 | 50 | 0.3 | 2 | 0 |
| 26 | 55 | 30 | 100 | 0.1 | 3 | 3 |
| 27 | 55 | 30 | 150 | 0.2 | 1 | 0 |

The amount of amplification obtained from each of these reactions was scored based on 0 to 5 system. This data was used to train a neural network using backpropagation and sigmoidal transfer functions although this process is not limited to these transfer functions and learning algorithms. FIGS. 9 to 15 show the output from the neural network during training, and how each of the inputs relate to one another. Optimum temperature for the reaction is clearly ca. 50° C. from these data. Network information is described in Tables 3 to 5. (N. B. data genetic algorithms could be used to define reaction optima by testing a wide range of input signals and selecting for maximum outputs).

TABLE 3

Network Training Information

| | |
|---|---|
| Network Name: | NO NAME |
| Number of Layers: | 4 |
| Input Layer: | |
| Nodes: | 5 |
| Transfer Function: | Linear |
| Hidden Layer 1: | |
| Nodes: | 5 |
| Transfer Function: | Sigmoid |
| Hidden Layer 2: | |
| Nodes: | 3 |
| Transfer Function: | Sigmoid |
| Output Layer: | |
| Nodes: | 1 |
| Transfer Function: | Sigmoid |
| Connections: | FULL |
| Training Information: | |
| Iterations: | 775 |
| Training Error: | 0.002895 |
| Learn Rate: | 0.111424 |
| Momentum Factor: | 0.800000 |
| Fast-Prop Coef: | 0.000000 |
| Input node File: | C:\Qnet97t\samples\PCR Input.txt |
| Input Start Column: | 1 |
| Normalize Inputs: | YES |
| Output Node File: | C:\Qnet97t\samples\PCR Output.txt |
| Output Start Column: | 1 |
| Normalize Outputs: | YES |
| Training Patterns: | 27 |
| Test Pattern: | 0 |

TABLE 4

Training Targets and Predicted Outputs for PCR Amplification Using a 4 Layered neural network.

| Reaction | Target | Predicted |
|---|---|---|
| 1 | 2.000000 | 2.008679 |
| 2 | 2.000000 | 1.998197 |
| 3 | 5.000000 | 4.999532 |
| 4 | 5.000000 | 4.993848 |
| 5 | 0.000000 | −0.065793 |
| 6 | 0.000000 | −0.005967 |
| 7 | 0.000000 | 0.007813 |
| 8 | 0.000000 | −0.000233 |
| 9 | 0.000000 | 0.048163 |
| 10 | 2.000000 | 1.996414 |
| 11 | 3.000000 | 3.010950 |
| 12 | 4.000000 | 3.986164 |
| 13 | 1.000000 | 1.012590 |
| 14 | 3.000000 | 2.998190 |
| 15 | 4.000000 | 3.986575 |
| 16 | 5.000000 | 4.986286 |
| 17 | 4.000000 | 4.007507 |
| 18 | 3.000000 | 3.012231 |
| 19 | 0.000000 | −0.060089 |
| 20 | 1.000000 | 1.000848 |
| 21 | 5.000000 | 5.024660 |
| 22 | 5.000000 | 4.970664 |
| 23 | 0.000000 | 0.000820 |
| 24 | 2.000000 | 1.995387 |
| 25 | 0.000000 | 0.066374 |
| 26 | 3.000000 | 2.999384 |
| 27 | 0.000000 | −0.000950 |

TABLE 5

Network Weights and Adjustment Deltas.
Network Weights and Current Adjustment Deltas
Network Name: NO NAME
Iterations: 10000

| Layer | node | Connection | Weight | Weight Delta |
|---|---|---|---|---|
| 2 | 1 | 1 | 1.15091 | 0.000014 |
| 2 | 1 | 2 | 0.86859 | 0.000007 |
| 2 | 1 | 3 | 1.72548 | 0.000003 |
| 2 | 1 | 4 | −2.79642 | 0.000000 |
| 2 | 1 | 5 | −6.97007 | −0.000008 |
| 2 | 1 | 1 | 1.77795 | −0.000003 |
| 2 | 2 | 2 | −0.03676 | −0.000008 |
| 2 | 2 | 3 | 4.06031 | −0.000007 |
| 2 | 2 | 4 | −0.75059 | −0.000002 |
| 2 | 2 | 5 | −4.99932 | 0.000007 |
| 2 | 3 | 1 | −2.30613 | −0.000104 |
| 2 | 3 | 2 | −2.38492 | −0.000003 |
| 2 | 3 | 3 | −0.72564 | −0.000005 |
| 2 | 3 | 4 | 0.35246 | 0.000009 |
| 2 | 3 | 5 | 4.50212 | 0.000009 |
| 2 | 4 | 1 | −10.99939 | 0.000005 |
| 2 | 4 | 2 | 4.12186 | −0.000005 |
| 2 | 4 | 3 | −0.27209 | 0.000008 |
| 2 | 4 | 4 | 0.64145 | −0.000016 |
| 2 | 4 | 5 | −0.63613 | −0.000005 |
| 2 | 5 | 1 | −7.46985 | −0.000008 |
| 2 | 5 | 2 | −1.74181 | 0.000004 |
| 2 | 5 | 3 | 2.85897 | −0.000001 |
| 2 | 5 | 4 | −0.11206 | 0.000003 |
| 2 | 5 | 5 | 3.16325 | 0.000007 |
| 3 | 1 | 1 | −1.70294 | −0.000002 |
| 3 | 1 | 2 | 2.71630 | −0.000002 |
| 3 | 1 | 3 | −1.11906 | −0.000002 |
| 3 | 1 | 4 | 5.30498 | 0.000015 |
| 3 | 1 | 5 | −3.25660 | −0.000011 |
| 3 | 2 | 1 | 5.48513 | 0.000007 |
| 3 | 2 | 2 | 4.11580 | 0.000003 |
| 3 | 2 | 3 | −0.09909 | −0.000007 |
| 3 | 2 | 4 | 6.50361 | 0.000002 |
| 3 | 2 | 5 | −7.38153 | −0.000009 |
| 3 | 3 | 1 | 0.12320 | 0.000000 |
| 3 | 3 | 2 | 1.73109 | 0.000007 |
| 3 | 3 | 3 | −4.40772 | 0.000000 |
| 3 | 3 | 4 | −0.02973 | −0.000009 |
| 3 | 3 | 5 | −1.14767 | −0.000002 |
| 4 | 1 | 1 | 6.41485 | 0.000013 |
| 4 | 1 | 2 | −7.82154 | −0.000013 |
| 4 | 1 | 3 | 3.38027 | −0.000002 |

Applications

Currently, the major challenge for PCR techniques is the development of "intelligent" instrumentation that can control the profile of the temperature cycles to optimise the level of amplification. Presently this requires a high technical involvement to define cycling conditions. Optima are found by repetitive trial and error experiments. This is expensive in terms of lab time, operator time, and in consumables. Optimal conditions are rarely found and, where sub-optimal conditions are used, subsequent interpretation and/or analysis of the amplification results is difficult.

The process described here can be used to optimise thermal cycling conditions by intelligent control of the cycling conditions. It takes advantage of the fact that denaturation, annealing and extension are not limited to fixed temperatures in the cycle but extend over a range of temperatures in the profile. Modelling these events over the entire cycle allows optimisation of the times allowed for each event. Mispriming, inactivation and depurination events are reduced as a consequence of the optimisation by decreasing exposure to conditions that promote these events. This method can be further refined by taking into account the difference between block and sample temperature. There is a considerable lag between the two, which has a significant effect on the level of amplification.

Details about the reaction mixture, concentration of $Mg^{2+}$, dNTPs, primer sequence, template data, etc., are used to define the membership functions. Reaction data and predicted template size are used to model the reaction and determine the level of amplification. Genetic algorithms are used to optimise the time profile of the cycles. This removes the need for operator programming and provides a framework for program standardisation.

Combining online monitoring of amplification with this process can be used to dynamically maintain optimum amplification conditions in real-time. This has particular use in diagnostic applications where maintaining the integrity of the amplification is a critical factor for quality control. Comparison of expected and achieved amplification can be used to determine where reaction performance is being compromised. This information can be used to either update cycling conditions in order to maintain optimum amplification, and/or warn the user about the problem.

Future challenges for NAA technologies include decentralisation from analysers in hospital laboratories that have high associated costs in terms of laboratory space and the employment of technical operators, to application in the field (e.g. by local health clinics). This has a number of problems associated with it. Adverse operating conditions, differences in sample preparation and operator error, will all alter amplification and subsequent data interpretation. The need for robust amplification conditions and quality control procedures that compensate for changes in operational environment will speed acceptability of PCR-based diagnostics.

As a qualitative test, important performance characteristics need to be understood and defined for each application. Specimen type and clinical setting may affect interpretation of NAA tests. False-negative PCR results often occur due to the presence of inhibitors in the clinical specimen, changes in the operational environment or operator error. False-positive results may stem from contamination of reagents with target sequences. The sensitivity cut-off (e.g. sensitivity to gene copy number, annealing temperature, etc.), and the zone of poor reproducibility around this cut-off, can be defined in terms of PCR performance characteristics. These characteristics, along with the type of specimen and the clinical purpose of the test, provide a framework on which quality control can be considered. Our application provides the basis for maintaining optimal amplification, rapidly establishing the factors controlling the cut-off limits for particular amplifications.

Reactions optimised by our process have inherently increased robustness. This process can therefore be used as the basis of a standardised optimisation procedure. Robustness to variables such as the variation in the performance of the cycling instrument, etc., will enhance specificity and sensitivity. Additionally, a large amount of information can be extracted using this procedure providing the basis for stringent quality control of reaction performance. Vital information about the performance of the thermal cycler, variation in essential components of the reaction mixture, operating environment, and the level of nucleic acid material provided for the test, can be obtained from a limited number of reactions. Importantly, the preferred method provides a means for "building-in" the ability to operate under different conditions. It also allows feedback-optimisation of subsequent assays by continually monitoring the performance of the assay procedure.

The disclosure in British patent application no. 9,720,926.6, from which this application claims priority, and in the abstract accompanying this application are incorporated herein by reference.

What is claimed is:

1. A method of optimizing the cycling conditions used to control a PCR (polymerase chain reaction) by:

assigning normalized membership values for denaturation, annealing and extension events specifying the relative contribution of each event in dependence upon sample temperature and time over a single PCR cycle;

defining populations of bit string chromosomes, each chromosome representing the total time profile $(t_1-t_6)$ of a single PCR cycle;

evolving said populations using genetic algorithms thereby determining the optimum times required to complete each event by modeling PCR amplification using said time profiles and said membership values;

whereby neutral net algorithms are used to associate said membership values to said time profiles $(t_1-t_6)$ and to confirm and/or modify PCR amplification by means of a predicted level thereof.

2. A method according to claim 1, wherein the relative contributions of denaturation, annealing and extension are calculated through assignment of membership values.

3. A method according to claim 2, wherein membership values are used to determine the relative amounts of denaturation, annealing and extension at specific time points or over a series of time points.

4. A method according to claim 1, wherein the method is used to standardize times used for PCR protocols or to optimize PCR protocols.

5. A method according to claim 1, wherein the method is used to transfer protocols from one thermal cycler to another, wherein the relative contributions of denaturation, annealing and extension are first calculated taking into account the thermal performance of the source cycler, and then transferred to the target cycler by taking into account the differences in cycler performance.

6. A method according to claim 1, wherein on-line monitoring is used to provide feed-back information about the performance of a reaction to allow fine adjustment of the calculated cycling times.

7. A method according to claim 1, wherein a neutral network is used to gain information about optimum cycling conditions.

8. A method according to claim 1, wherein a neural network is used to calculate, confirm or modify the calculated level of amplification.

9. A system for optimizing the cycling conditions used to control a PCR (polymerase chain reaction) including processing means operable to assign normalized membership values for denaturation, annealing and extension events specifying the relative contribution of each event in dependence upon sample temperature and time over a single PCR cycle; means for defining populations of bit string chromosomes, each chromosome representing the total time profile ($t_1$–$t_6$) of a single PCR cycle; means of evolving said populations using genetic algorithms so as to determine the optimum times required to complete each event by modeling PCR amplification using said total time profiles and said membership values; and means providing neutral net algorithms for associating said membership values to said time profiles ($t_1$–$t_6$) and for confirming and/or modifying PCR amplification by means of a predicted level thereof.

* * * * *

UNITED STATES PATENT AND TRADEMARK OFFICE
CERTIFICATE OF CORRECTION

PATENT NO. : 6,493,640 B1
DATED : December 10, 2003
INVENTOR(S) : John Michael Clarkson and Benjamin David Cobb It is certified that error appears in the above-identified patent and that said Letters Patent is hereby corrected as shown below:

Column 3,
Line 14, "as specified in the claim:" should read -- as specified in claim 1. --

Column 8,
Line 8, add line -- output statistics on population --.

Column 10,
Line 3, "$^{\Delta}$" should read -- $\alpha$ --.

Column 14,
Lines 35 and 60, "neutral" should read -- neural --.

Signed and Sealed this

Tenth Day of June, 2003

JAMES E. ROGAN
*Director of the United States Patent and Trademark Office*